United States Patent
Arling

(10) Patent No.: US 6,947,101 B2
(45) Date of Patent: Sep. 20, 2005

(54) CONTROL DEVICE WITH EASY LOCK FEATURE

(75) Inventor: Paul D. Arling, Irvine, CA (US)

(73) Assignee: Universal Electronics Inc., Cypress, CA (US)

( * ) Notice: Subject to any disclaimer, the term of this patent is extended or adjusted under 35 U.S.C. 154(b) by 713 days.

(21) Appl. No.: 09/922,562

(22) Filed: Aug. 3, 2001

(65) Prior Publication Data

US 2003/0025840 A1 Feb. 6, 2003

(51) Int. Cl.⁷ .................................................. H04N 5/44
(52) U.S. Cl. ........................................................ 348/734
(58) Field of Search ........................... 348/734; 345/173, 345/172, 168, 169; 340/825.69, 825.72, 825

(56) References Cited

U.S. PATENT DOCUMENTS

| | | |
|---|---|---|
| 4,712,105 A | 12/1987 | Kohler |
| 4,959,810 A | 9/1990 | Darbee et al. |
| 5,228,077 A | 7/1993 | Darbee |
| 5,255,313 A | 10/1993 | Darbee |
| 5,414,426 A | 5/1995 | O'Donnell et al. |
| 5,481,256 A | 1/1996 | Darbee et al. |
| 5,515,052 A | 5/1996 | Darbee |
| 5,537,463 A | 7/1996 | Escobosa et al. |
| 5,835,732 A | 11/1998 | Kikinis et al. |
| 5,956,025 A | 9/1999 | Goulden et al. |
| 6,097,441 A | 8/2000 | Allport |
| 6,104,334 A | 8/2000 | Allport |
| 6,127,941 A * | 10/2000 | Van Ryzin ............. 340/825.69 |
| 6,208,341 B1 | 3/2001 | van Ee et al. |
| 6,292,210 B1 | 9/2001 | Gerszberg et al. |
| 6,437,836 B1 * | 8/2002 | Huang et al. ................ 348/734 |
| 6,567,011 B1 * | 5/2003 | Young et al. .......... 340/825.69 |
| 6,629,077 B1 * | 9/2003 | Arling et al. ............... 704/275 |
| 6,633,281 B2 * | 10/2003 | Lin et al. ..................... 345/173 |
| 6,750,803 B2 * | 6/2004 | Yates et al. ................. 341/176 |

OTHER PUBLICATIONS

U.S. Appl. No. 09/418,901, filed Oct. 14, 1999, Young et al.
U.S. Appl. No. 09/718,931, filed Nov. 21, 2000, Arling et al.
Home Theater Master, Universal Remote Control, SL–8000 Operating Manual, Rev. 1, pp. 1–50.

* cited by examiner

Primary Examiner—Paulos M. Natnael
(74) Attorney, Agent, or Firm—Gary R. Jarosik

(57) ABSTRACT

Methods for identifying control keys with particular devices are disclosed along with methods of assigning control keys to particular devices. In particular, a remote control comprises a set of hard keys comprising channel group keys and volume group keys and a set of soft keys activated via a touch screen display. The display identifies the device the volume group keys are set to control and the device the channel group keys are set to control. Selecting the device currently controlled by the channel group keys by, for example, depressing the device indicator on the display screen, initiates a set up mode that displays numerous devices that may be controlled by the channel group keys. Selecting one of the numerous devices assigns the channel group keys to that device.

15 Claims, 5 Drawing Sheets

CONTROL DEVICE WITH EASY LOCK FEATURE

FIELD OF THE INVENTION

The present invention relates to hand-held control modules, as well as consumer electronic devices. Specific exemplary embodiments discussed relate to hand-held remote controls and electronic devices such as televisions connected to cable set-top boxes and audio systems.

BACKGROUND OF THE INVENTION

The description of art in this section is not intended to constitute an admission that any patent, publication or other information referred to herein is "prior art" with respect to this invention, unless specifically designated as such.

While the present invention relates to hand-held control modules generally, it will be better understood within the discussion of exemplary embodiments directed toward universal remote controls. Universal remote controls typically offer a preprogrammed set of standardized keys for each device type supported. These provide for the common operational functions of the device but do not necessarily offer the full range of features available on the original manufacturer's remote.

U.S. patents and applications relevant to remote control technology include U.S. Pat. Nos. 5,515,052; 5,255,313; and U.S. patent application Ser. No. 09/418,091 filed Oct. 14, 1999, which are incorporated herein by reference. Pat. '052 discloses a universal remote control with function synthesis. The remote control comprises driver circuitry for communicating code signal generation sequences including a code generated command signal followed by a code setting signal; and memory for storing information therein. Pat. '313 discloses a universal remote control system having a signal generator to transmit signals which will cause specific functions to occur in specific controlled devices. Patent application Ser. No. '091 discloses means and methods for operating a remote control.

Users of universal remote controls who need access to one or more functions not preprogrammed into the unit must then use a learning capability or a feature, such as a function synthesizer (e.g., the function synthesizer discussed in Pat. '052) to add the desired extra functions to their remotes. Other U.S. Patents related to remote control technology, and in particular, relating to learning technology include U.S. Pat. Nos. 4,959,810; 5,228,077; and 5,537,463, which are incorporated herein by reference.

Pat. '810 discloses means for transferring instructions and/or data to RAM wherein the instructions and/or data is transferred from a source external to the RAM. Pat. '077 discloses a remotely upgradable universal remote control. Pat. '463 discloses means in the remote control for picking up an electro-magnetic signal from an electro-magnetic signal source and storing output signal data in memory. The output signal data stored in memory may correspond to control function data which may be transmitted to a device to be controlled.

U.S. Pat. No. 5,481,256 issued Jan. 2, 1996, is incorporated herein by reference. The '256 patent discloses a circuitry for coupling a SCAN key to a microprocessor and a channel scan program. A channel scan of channels is initiated when the SCAN key is depressed.

U.S. Pat. No. 5,414,426 issued May 9, 1995, is incorporated herein by reference. The '426 patent discloses an entry program for enabling a user to define a macro for selecting at least one favorite channel, whereby rapid selection of at least one favorite channel is made upon subsequent depression of a MACRO key.

The following U.S. patent applications disclose methods for controlling media systems, and for capturing state information. U.S. patent Ser. No. 09/718,931 filed Nov. 21, 2000, and U.S. patent Ser. No. 09/418,091 filed Oct. 14, 1999, are incorporated herein by reference. The '931 application discloses a media return system with return to state capability. The status of the system is quickly captured and provides a simple means to reset the system to, for example, the state prior to channel surfing. The '091 application discloses a media system with punch-through capability. Functional control may be locked across devices to control a particular device while operating in a different device mode.

For example, a volume or channel lock feature assigns one device type permanently to the specified set of keys, namely the volume or channel control keys. There are advantages to cross linking devices and control keys. A cable subscriber might, for example, want his channel switching keys to always send cable box codes, regardless of what mode the remote is in. A consumer who plays the TV sound back through a home theatre surround sound system might want the volume keys to always send audio system codes, e.g., amplifier codes.

U.S. Pat. No. 4,712,105, which issued Dec. 8, 1987, and European Patent Application No. 0120345 discussed therein are both incorporated herein by reference. The '105 patent describes the '345 application as teaching a hand apparatus comprising a limited number of keys, but with which all functions of a plurality modules (devices) can be controlled. For that purpose, one module is assigned to each key or a number of keys by changing (device) modes. To inform the user which function is assigned to which key at any given instant, each key is assigned a key element display element on which the actual control function of the key is displayed. The '345 application apparatus, while useful, has required display elements of a large size such that the actual control function can be shown clearly enough. Also, all of the display driver circuits require a considerable amount of space. Therefore, to keep the apparatus as a hand-held apparatus, the number of keys it can have are limited.

To overcome problems associated with the '345 application, the '105 patent provides a hand apparatus comprising a plurality of module keys. A module is assigned to each key. A user can only gain access to the relevant module through its key. One single display element of the dot-matrix type displays control functions associated with the modules to be controlled. Around the dot-matrix type display multi-functional control buttons are arranged such that the dot-matrix displays the function assigned to a multi-functional control button in a given mode.

One significant drawback of the apparatus of the '105 patent is that it is uni-mode—there is no way to lock devices across modes, as taught in the '091 application. Another significant drawback for applicant's objectives is that the apparatus is limited to one dot-matrix function display per multi-function button. This one button-one display approach appears to be an essential feature that the apparatus of the '105 patent uses to address problems discussed in the '105 patent.

While locked controls, such as are described in the '091 application, are generally useful, they are often difficult to set up—there is generally no intuitive way to input the desired device. Once the locked controls are set, they can be confusing to one who forgets, or does not know, to what device the control keys are locked. The prior art addresses key identification in various ways. But none sufficiently address key identification or other problems associated with locking keys across devices.

SUMMARY OF THE INVENTION

This paper teaches approaches for overcoming drawbacks associated with control keys locked across devices. The terms keys and buttons are used interchangeably and should be construed broadly. The term soft key may be thought of as a key on a touch screen that is activated by depressing it. The term soft key is to be contrasted with the term hard key. Hard keys may be thought of as physical three dimensional keys as opposed to virtual keys on a display screen. Soft keys, i.e., a corresponding icon, for example, can be located at different positions on a display screen depending on the mode of operation or operation being performed. Hard keys, by contrast, are generally fixed in a specific location, although the function associated with the hard key may be reassigned via various methods. Thus, the terms soft keys and hard keys have relative meaning and soft keys are generally associated with a display and hard keys are generally not.

One approach to locking keys to devices utilizes a remote control comprising a touch screen display and hard buttons. The hard buttons may be used as the control buttons for controlling various functions or groups of functions. For example, volume and channel control buttons can be used to control functions associated with volume and control features. The hard buttons may be located near the edge of the touch screen or other predetermined location. The touch screen can be used to display an indication of which device the hard control keys are currently set ("locked") to control. Preferably the style design of the remote control, by way of graphical and physical attributes, can be used to link hard keys to corresponding display screen identifiers. Key identification methods other than stylistic means will be apparent to those of skill in the art and may for example include coloring, lighting, key shaping and positioning, and various combinations.

A touch screen can be used to facilitate setting device assignments to keys ("locking" the keys). For example, suppose that the channel control keys are locked to the cable device and such locking is indicated on the touch screen. Touching the area on the touch screen that indicates that the cable box (labeled, e.g., CAB) is the device controlled by the channel keys (e.g., touching a device type indicator) can initiate a setting mode. A display representing all possible devices having channels that the channel key may change can be displayed as soft buttons on the touch screen. The display may represent all typical controlled devices, or any subset, as for example only devices having controllable functions corresponding to the keys being assigned. Touching one of the soft buttons would lock the channel keys to the device selected via the soft button. A device (type) indicator corresponding to the selected device would then appear on the touch screen where the cable indicator previously indicated that a cable device was controlled by the channel keys.

A remote control according to the teachings comprises a plurality of hard keys comprising at least one control group of keys. A touch screen is operably connected and adapted to display a plurality of soft keys corresponding to a plurality of device types controllable by the control group of keys. The touch screen also displays at least one of a plurality of device type indicators, wherein the device type indicators displayed corresponds to a device the control group of keys is assigned to control. The remote control preferably has memory comprising programming for entering a set up mode and assigning a device to be controlled to the control group of keys, whereby the control group of keys may control the corresponding group of functions of that device. The programming may comprise programming for assigning, in response to selection of one of the soft keys by a user, a corresponding one of the plurality of device types to the control group of keys. The programming preferably enables the remote control to display a device type indicator corresponding to the device type assigned to the control group of keys.

In a particular embodiment, the remote control comprises a plurality of hard keys comprising a channel control group of keys and a volume control group of keys; the channel and volume group of keys respectively controlling channel and volume functions of target devices. A screen displays one each of first and second pluralities of device type indicators. Visual indicia associates the first device type indicator with the channel control group of keys. The second device type indicator is visually associated with the volume control group of keys. Thusly, a user may readily discern which device the channel control group of keys is set to control and which device the volume control group of keys is set to control.

More generally, a remote control may comprise a plurality of keys comprising at least one control group of keys and a display displaying at least one of a plurality of device type indicators. And visual indicia associates the displayed device type indicator with the control group of keys.

An objective of this application is to provide methods and means that allow a user to readily assign keys of a control device to target devices.

Another object of this application is to provide methods and means that allow a user to readily discern which devices are controlled by what keys of a control device.

Other objects and advantages in accordance with this application will be apparent to those of skill in the art from the teachings disclosed herein.

BRIEF DESCRIPTION OF THE DRAWINGS

In the interest of enabling one of skill in the art to practice the invention, exemplary embodiments are shown and described. For clarity, details apparent to those of skill in the art and reproducible without undue experimentation are generally omitted from the drawings and description.

DESCRIPTION OF EXEMPLARY EMBODIMENTS

Figure 1:
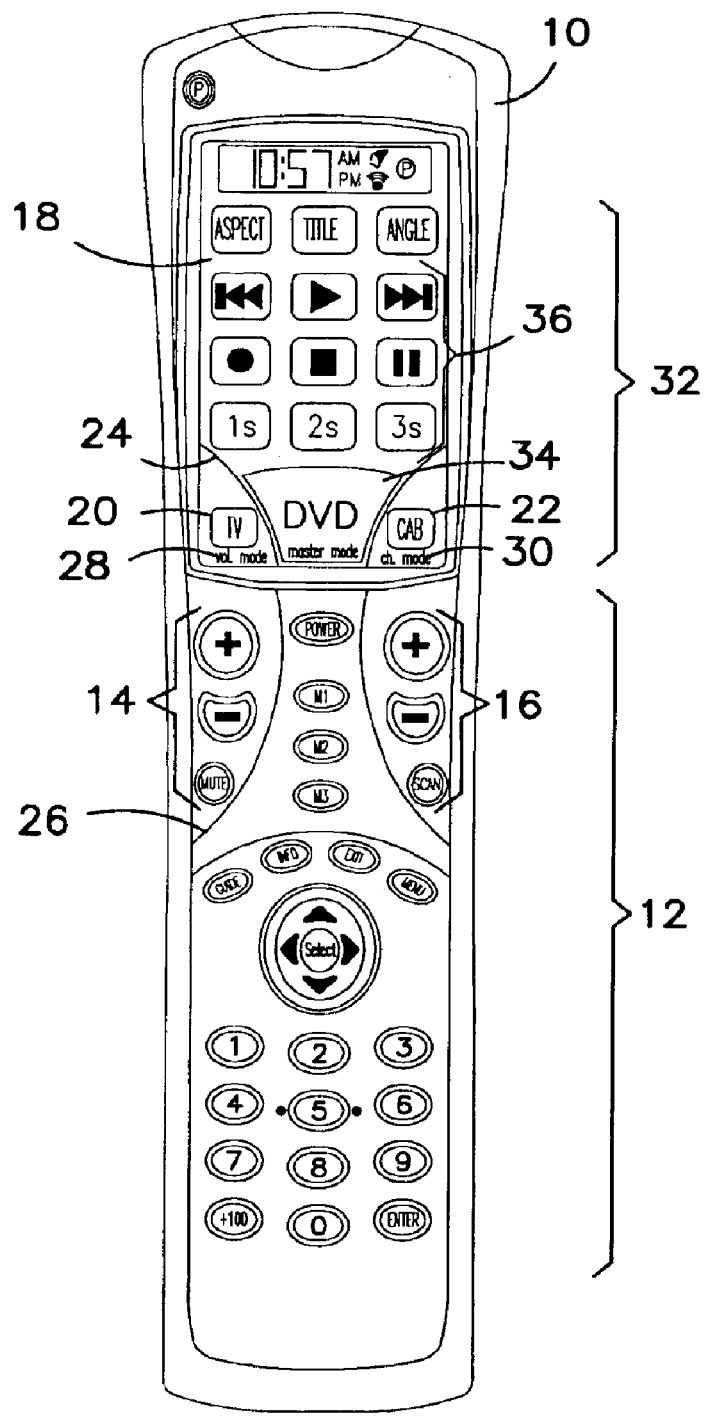
FIG. 1 shows a remote control that indicates the device volume and channel control groups of keys are, respectively, set to control.

While this disclosure is discussed in relation to remote controls, other uses will be apparent from the teachings disclosed herein. It will be better understood from the following detailed description of exemplary embodiments with reference to the attached drawings, wherein like reference numerals and characters refer to like parts, and by reference to the following claims.

FIG. 1 discloses a remote control 10 according to an embodiment of the invention. The remote control 10 comprises a plurality of hard keys 12. The hard keys 12 comprise a volume control group of keys 14 and a channel control group of keys 16. A display screen 18 displays device type indicators 20 and 22. The device type indicator 20 indicates a TV device; the device type indicator 22 indicates a cable device. In addition to textual information, iconic, as well as other forms of indication, may be used.

The device type indicator 20 is visually associated with the volume control group of keys 14 and the device type indicator 22 is visually associated with the channel control group of keys 16. The visual association may generally take place through stylistic markings or stylistic configuration of the remote 10 or a combination of the two. The stylistic markings comprise, for example lines 24 and 26 and text 28. The stylistic design comprises, for example the physical design aspects, including key layout, case and key configuration, and other physical characteristics of the remote control. Stylistic configuration includes such things as positions and shape of key as well as color coding, etc. Albeit color coding also may be considered a form of stylistic marking.

The volume control group of keys 14 is identified as volume control keys in the embodiment shown in FIG. 1 by the stylistic text markings 28 displaying "VOL. MODE". Likewise, the channel control group of keys 16 is identified as being channel control keys by stylistic marking 30. In the default setting the soft keys 32 show control keys associated with the DVD device. In particular, transport function control keys 36 are displayed on the touch screen 18.

Figure 2:
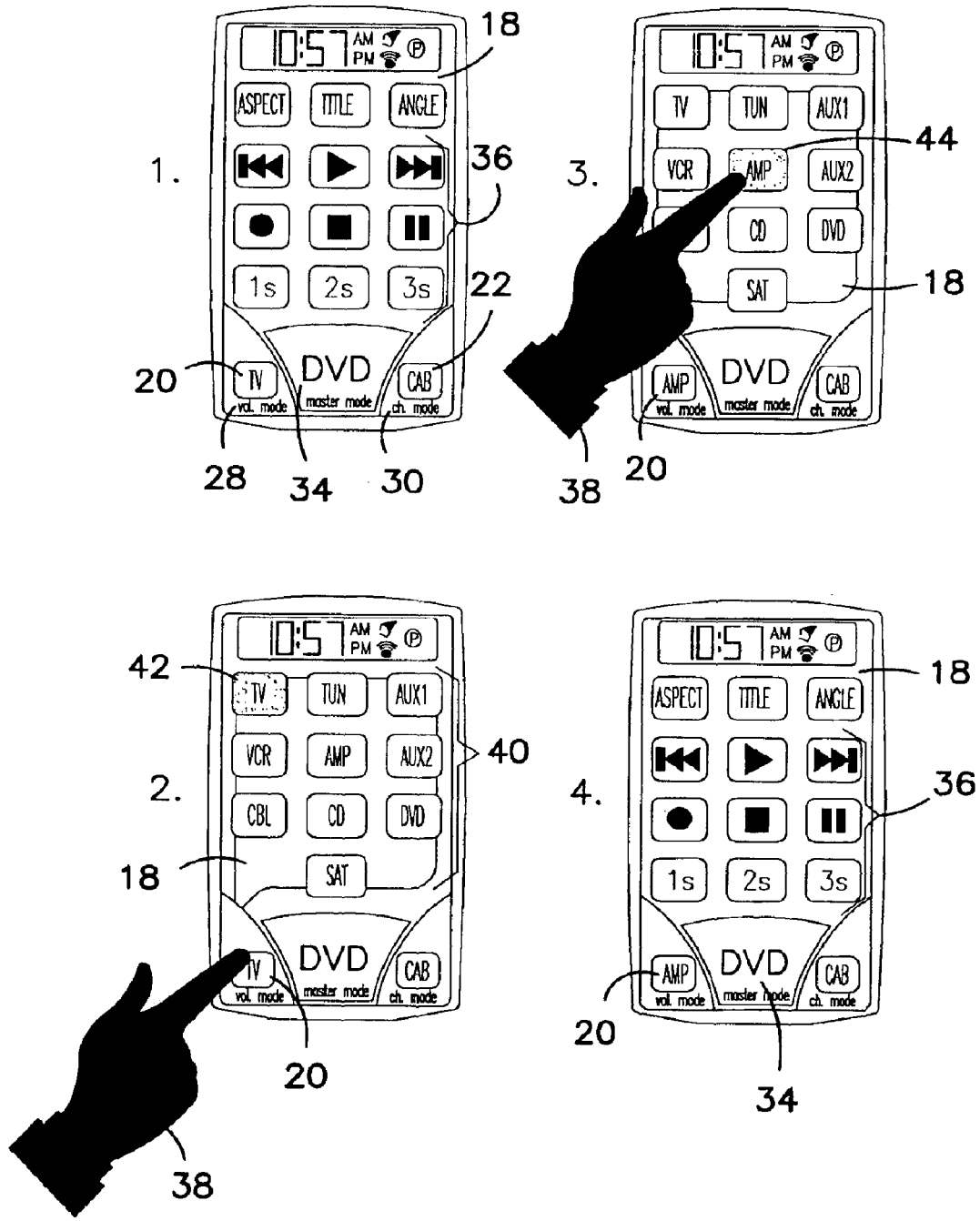
FIG. 2 pictorially shows a user locking the volume control group of keys to the amplifier. The set up mode is easily initiated by the user by selecting the device the volume control group of keys is currently locked to control, the TV.

In the embodiment shown in FIGS. 1 and 2, the display 18 comprises a touch screen that includes a plurality of soft keys 32. For some applications a touch screen is not required, but a display is desirable; still other applications, such as those directed toward programming features and stylistic means, do not require a display.

In FIG. 1 the remote control 10 is set in a master mode associated with a DVD device. This setting is indicated by device type identifier 34.

Thus, in the default setting of the remote control 10, the soft keys 32 show control keys associated with a DVD device. In particular, transport keys 36 are displayed on the touch screen 18. Also, the majority of the hard keys, excluding those associated with the channel and volume control groups described earlier, will send DVD IR control codes. Various default settings may be utilized as appropriate for various applications.

In an embodiment of the invention the remote control 10 comprises memory for entering a set up mode and assigning a device, for example, a DVD device, a TV device, a cable device, to be controlled by a control group of keys, for example the volume control group of keys 14 or the channel control group of keys 16.

FIG. 2 pictorially depicts one method for setting a control group of keys to control a particular device. FIG. 2.1 shows the transport keys 36 displayed on the touch screen 18; the remote control is in DVD master mode, as indicated by the master mode device type indicator 34. The control group of keys 14 are indicated to control volume by control (or function control) indicator 28. The device whose volume is controlled by the control group of keys 14 is a TV, as indicated by device type indicator 20. Similarly, the control group of keys 16 are set to control channel functions of a cable device. The control group of keys 14 are also referred to herein as the volume control group of keys, and similar designations. Similarly with respect to the control group of keys 16.

Supposing a user 38 desires to change the volume control keys 14 to control the volume of a different device. The user 38 selects the TV indicator 20 as shown in FIG. 2.2. In response to the user selecting the television indicator 20, the display 18 displays a plurality of soft keys 40 corresponding to a plurality of device types. The volume control keys 14 may be set to control some or all of the displayed devices, depending on the remote control. The soft key 42 corresponding to the TV device is highlighted because that is the current device the volume control group of keys 14 is set to control. Other methods for indicating the current device may be used, if such indication is desired for a particular application.

FIG. 2.3 shows the user 38 having selected the soft key 44 corresponding to an amplifier device. The device type indicator 20 has changed to indicate that the volume control group of keys 14 will control the volume of the amplifier. FIG. 2.4 shows the display 18 after the volume control group of keys 14 have been set to control the amplifier. The device type indicator 20, which formerly indicated the TV was controlled, now indicates the amplifier will be controlled by the volume control group of keys 14. Since the remote control is still set in a DVD master mode the transport keys 36 are displayed in the touch screen 18.

Figure 3:
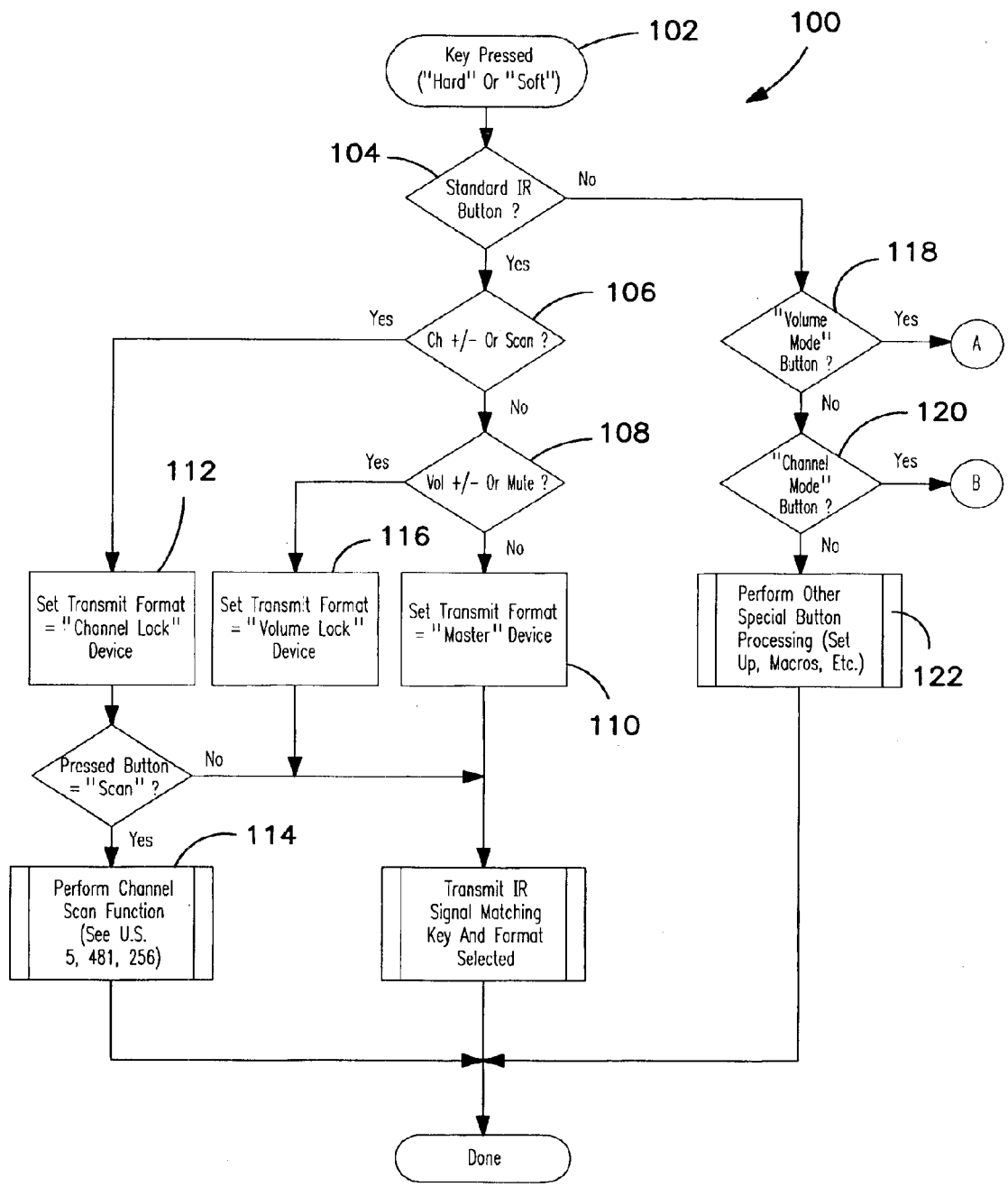
FIG. 3 is a flowchart of how a remote control responds to key presses by a user.

FIG. 3 is a flowchart 100 of one example of how a remote control embodying an aspect of the teachings herein may operate. Generally, the programming determines the appropriate format for a command transmitted from the remote control based on the master mode in which the remote control is set, or the mode or device to which the particular key is locked. The programming also monitors if the user is initiating operation to lock a control set of keys to another device.

With respect to flowchart 100, the remote control 10 determines if a key is pressed at Step 102. At Step 104 a determination is made as to whether the key pressed is a standard key. If the key is a standard key the programming goes on to determine if the key press is associated with one of the locked control groups keys (Steps 106 and 108). If the key is not associated with one of the control groups, Step 110 will set the format for the command to be transmitted to conform with the set master mode. For example, in FIG. 1 the master mode is set for a DVD device. Therefore, the command format will be one which will be recognized by, and thus control, the DVD.

If the key pressed is one of the channel control group of keys, then the format of the transmission will be set to conform to the device represented by device indicator type 22. The format is set at Step 112. If the scan button is pressed, a channel scan may be performed as indicated in U.S. Pat. No. 5,481,256, or other conventional methods known to those of skill in the art. See Step 114.

If the key pressed is one of the volume control group of keys, then at Step 116 the command transmission format is set to correspond to the device indicated by device indicator type 20.

If the key pressed is the device indicator type 20, which is associated with the volume control group of keys 14, then at Step 118 the programming will proceed to reassign the device controlled by the volume control group of keys 14. See FIG. 4. If the key pressed is the device type indicator 22, which is associated with the channel control group of keys 16, then at Step 120 the programming will proceed to reassign the device controlled by the channel control group of keys 16.

If the key pressed is none of the foregoing, then at Step 122 the programming goes on to perform specific functions associated with the key pressed.

Figure 4:
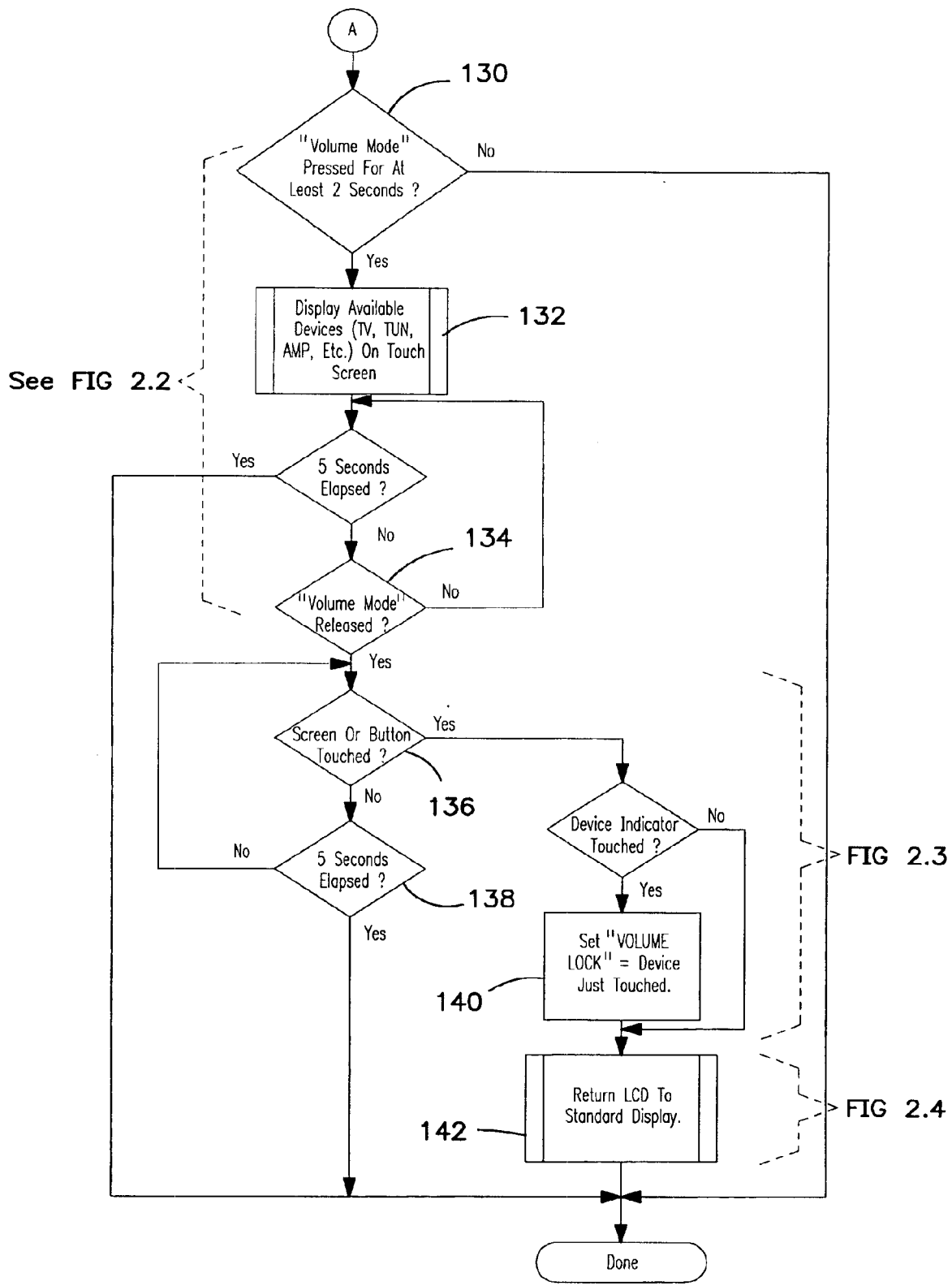
FIG. 4 shows a flowchart for locking the volume control group of keys to a different device.

FIG. 4 discloses an exemplary method for assigning the device to be controlled by the volume control group of keys 14. Steps in FIG. 4 that correspond to steps pictorially depicted in FIG. 2 are indicated. At Step 130, if the device type indicator 20, which is associated with the volume control group of keys 14, is pressed a predetermined amount of time, then at Step 132 the devices available for control are displayed on the touch screen 18.

If the device type indicator key 20 is held too long, such as by a book or other object inadvertently depressing the key (e.g. accounting for the couch cushion crush factor), the programming will take the remote control out of set up mode. Similarly, at Steps 136–138, if one of the soft keys 40 (which are associated with the available devices) is not selected within a predetermined amount of time, the programming will take the remote control 10 out of set up mode.

At Step 140 the volume control group of keys 14 is set to the device corresponding to the soft key selected by the user 38. In FIG. 2.3 soft key 44 is selected. Setting the volume control group of keys 14 to the selected device is often referred to as locking the volume control keys or setting the volume lock, and other similar phrases.

At Step 142, the display 18 is returned to its default, or standard, setting.

Figure 5:
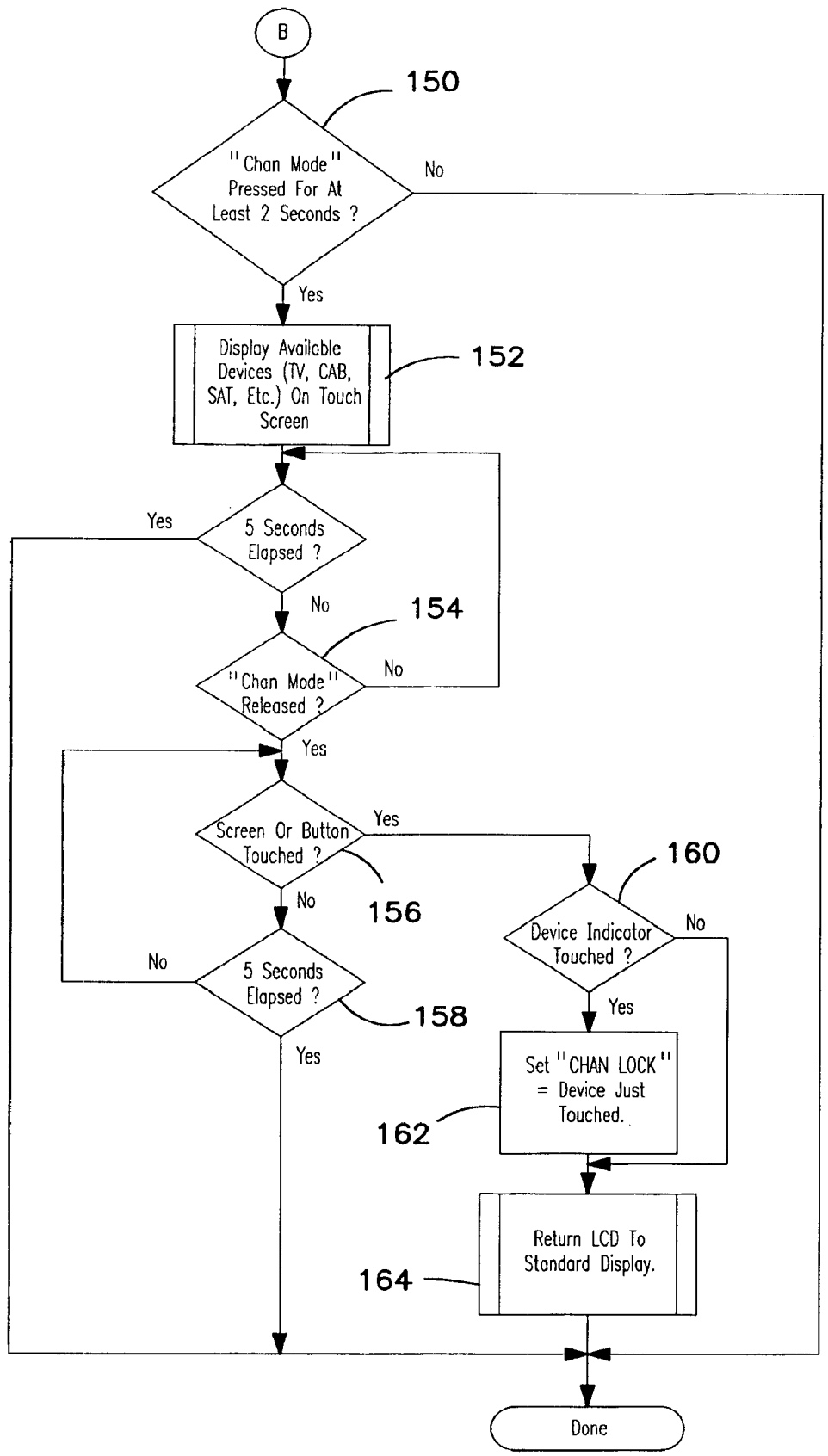
FIG. 5 is a flowchart for locking the channel control group of keys to a device.

FIG. 5 shows a flowchart of an exemplary method of carrying out a channel lock operation. Steps 150–158 determine if the device type indicator 22, which is visually associated with the channel control group of keys 16, has been selected by the user 38.

In response to selection by the user 38, the programming causes the display 18 to display the available devices. Steps 154–158 determine if another key is pressed (soft or hard), or whether the channel lock operation should be terminated. Steps 160–162 set the channel lock to the device corresponding to the soft key selected by the user 38.

After the channel lock is set, or a key other than an available device is selected, then at Step 164 the programming returns the display 18 to its default display.

The above described exemplary apparatus and methods allow a user 38 to readily discern what device a particular control group of keys is set to control. The user is also provided with a straight forward and intuitive way of setting, or locking, a particular control group of keys to a particular device.

Some entertainment systems comprise duplicate device types. Consider a system comprising both an audio component and a surround sound component. If the remote only comprised one audio indicator, locking the keys for the audio components in such a system may be confusing and potentially limiting. This problem is solved, along with controlling non-standard devices, by including one or more auxiliary device indicators. A complementary approach is to allow any device type indicator to be reprogrammed to any other device type indicator. If the same device type indicator is already a part of the set displayed, the new device type indicator is given the next higher number, e.g. AUDIO 2.

While aspects of the invention has been particularly shown and described with reference to particular embodiments thereof, it will be understood by those skilled in the art that various changes in form and detail may be made therein without departing from the spirit and scope of the invention. The scope of the claimed invention is intended to be defined by following claims as they would be understood by one of ordinary skill in the art with appropriate reference to the specification, including the drawings, as warranted.

The invention claimed is:

1. A controlling device comprising: a plurality of keys comprising a first control group of keys and a second control group of keys; a first device type indicator of a first plurality of device type indicators, wherein the first plurality of device type indicators correspond to devices the first control group of keys may be set to control and the first device type indicator is visually associated with the first control group of keys, whereby a user may readily discern which device the first control group of keys is set to control based on the first device type indicator visually associated with the first control group of keys; a second device type indicator of a second plurality of device type indicators, wherein the second plurality of device type indicators correspond to devices the second control group of keys may be set to control and the second device type indicator is visually associated with the second control group of keys, and a user may readily discern which device the second control group of keys is set to control based on the second device type indicator visually associated with the first control group of keys; a first plurality of device type keys corresponding to devices the first control group of keys may be set to control upon selection of one of the first plurality of device type keys; a second plurality of device type keys corresponding to devices the second control group of keys may be set to control upon election of one of the second plurality of device type keys; and wherein the first plurality and the second plurality of device type keys are soft keys and wherein the first device type indicator is different from the second device type indicator.

2. The controlling device as recited in claim 1, wherein the first plurality of device type keys is the same as the second plurality of device type keys.

3. The controlling device as recited in claim 1, comprising a touch screen, wherein the soft keys, the first device type indicator, and the second device type indicator are displayed on the touch screen.

4. The controlling device as recited in claim 3, wherein the first plurality of device type keys are displayed in response to a user selecting the first device type indicator.

5. A remote control comprising: a first control group of keys set to control one of a plurality of devices; means for indicating to a user which of the plurality of devices the first control group of keys is set to control; a second control group of keys set to control one of a plurality of devices; means for indicating to a user which of the plurality of devices the second control group of keys is set to control; means for setting the first control group of keys to a different one of the plurality of devices; means for indicating to a user a selection comprising the plurality of devices from which the user may select the different one device; and means for indicating to a user in which master mode the remote control is set; wherein the means for indicating which device is controlled by the first control group of keys, the means for indicating which device is controlled by the second control group of keys, and the means for indicating the master mode are adapted to operate simultaneously.

6. A controlling device, comprising:
- a plurality of function keys including a first group of function keys actuatable to command volume functions of a plurality of different appliances and a second group of function keys actuatable to command tuning functions of a plurality of different appliances;
- a plurality of device keys actuatable to select one of the plurality of different appliances as an appliance to be commanded upon actuation of the first group of function keys and actuatable to select one of the plurality of different appliances as an appliance to be commanded upon actuation of the second group of function keys;
- a first device type indicator visually associated with the first group of function keys to indicate to a user to which one of the plurality of different appliances was selected to be commanded upon actuation of a function key selected from the first group of function keys;
- a second device type indicator visually associated with the second group of function keys for indicating to a user which one of the plurality of different appliances was selected to be commanded upon actuation of a function key selected from the second group of function keys; and
- a third device type indicator for indicating to a user which one of the plurality of different appliances will be commanded upon actuation of a function key other than a function key selected from the first group of functions keys and the second group of function keys.

7. The controlling device as recited in claim 6, wherein the function keys comprise hard keys.

8. The controlling device as recited in claim 7, wherein the plurality of device keys comprise soft keys displayed using a touch screen.

9. The controlling device as recited in claim 8, wherein the first device type indicator is displayed in the touch screen in a location visually linked to the first group of function keys and the second device type indicator is displayed in the touch screen in a location visually linked to the second group of function keys.

10. The controlling device as recited in claim 6, wherein each of the function keys includes indicia representative of one or more functions to be commanded upon actuation of the function key.

11. The controlling device as recited in claim 6, wherein the first device type indicator and the second device type indicator each comprises alphanumeric symbols.

12. The controlling device as recited in claim 6, wherein the plurality of device keys are made available for actuation upon a user placing the controlling device into a setup mode.

13. A controlling device, comprising:
- a plurality of function keys including a first group of function keys actuatable to command volume functions of a plurality of different appliances and a second group of function keys actuatable to command tuning functions of a plurality of different appliances;
- a plurality of device keys actuatable to select one of the plurality of different appliances as an appliance to be commanded upon actuation of the first group of function keys and actuatable to select one of the plurality of different appliances as an appliance to be commanded upon actuation of the second group of function keys;
- a first device type indicator visually associated with the first group of function keys to indicate to a user to which one of the plurality of different appliances was selected to be commanded upon actuation of a function key selected from the first group of function keys; and
- a second device type indicator visually associated with the second group of function keys for indicating to a user which one of the plurality of different appliances was selected to be commanded upon actuation of a function key selected from the second group of function keys;
- wherein the first device type indicator is displayed in a touch screen in a location visually linked to the first group of function keys and the second device type indicator is displayed in the touch screen in a location visually linked to the second group of function keys and wherein the first group of function keys and the second group of function keys are contemporaneously available for actuation by a user and the first device type indicator and the second device type indicator are contemporaneously displayed.

14. The controlling device as recited in claim 13, wherein the function keys comprise hard keys.

15. The controlling device as recited in claim 13, wherein the first device type indicator and the second device type indicator each comprises alphanumeric symbols.

* * * * *